(12) United States Patent
Stanley

(10) Patent No.: US 11,354,311 B2
(45) Date of Patent: Jun. 7, 2022

(54) DATABASE-AGNOSTIC PARALLEL READS

(71) Applicant: International Business Machines Corporation, Armonk, NY (US)

(72) Inventor: Paul Stanley, Delray Beach, FL (US)

(73) Assignee: International Business Machines Corporation, Armonk, NY (US)

(*) Notice: Subject to any disclaimer, the term of this patent is extended or adjusted under 35 U.S.C. 154(b) by 322 days.

(21) Appl. No.: 16/553,314

(22) Filed: Aug. 28, 2019

(65) Prior Publication Data

US 2019/0384767 A1  Dec. 19, 2019

Related U.S. Application Data

(63) Continuation of application No. 15/281,204, filed on Sep. 30, 2016, now abandoned.

(51) Int. Cl.
  *G06F 17/30* (2006.01)
  *G06F 16/2453* (2019.01)
  *G06F 16/2455* (2019.01)

(52) U.S. Cl.
  CPC .. *G06F 16/24542* (2019.01); *G06F 16/24568* (2019.01)

(58) Field of Classification Search
  CPC ......... G06F 16/24542; G06F 16/24568; G06F 16/24532; G06F 16/24535; G06F 16/2471; G06F 16/24544
  See application file for complete search history.

(56) References Cited

U.S. PATENT DOCUMENTS

| | | | |
|---|---|---|---|
| 6,014,702 A | 1/2000 | King et al. | |
| 6,160,549 A | 12/2000 | Touma et al. | |
| 6,167,393 A | 12/2000 | Davis, III et al. | |
| 6,178,519 B1 | 1/2001 | Tucker | |
| 6,625,593 B1 * | 9/2003 | Leung | G06F 16/24532 |
| 7,433,863 B2 * | 10/2008 | Zane | G06F 8/30 |
| | | | 707/999.005 |
| 7,711,704 B2 | 5/2010 | Aziz | |
| 7,984,043 B1 * | 7/2011 | Waas | G06F 16/2471 |
| | | | 707/718 |
| 8,051,091 B2 | 11/2011 | Werner et al. | |
| 8,126,870 B2 | 2/2012 | Chowdhur et al. | |
| 8,190,823 B2 | 5/2012 | Waltermann et al. | |
| 8,666,966 B2 | 3/2014 | Ranganathan et al. | |
| 8,806,426 B2 | 8/2014 | Duffy et al. | |
| 8,909,671 B2 | 12/2014 | Pallares Lopez et al. | |

(Continued)

OTHER PUBLICATIONS

Data Platform for Machine Learning. SIGMOD, Jun. 2019.*

(Continued)

*Primary Examiner* — Daniel A Kuddus
(74) *Attorney, Agent, or Firm* — Edell, Shapiro & Finnan, LLC

(57) ABSTRACT

A query into a database is processed by receiving an instruction to partition data in the database into respective data partitions for the query. In response to the instruction, a query execution plan is generated that specifies the data from the database for the respective data partitions according to at least one data characteristic. The query execution plan is executed to compel reading the data of the data partitions from the database in respective data streams independently one from another.

9 Claims, 4 Drawing Sheets

(56) References Cited

U.S. PATENT DOCUMENTS

| | | | |
|---|---|---|---|
| 2005/0028134 A1* | 2/2005 | Zane | G06F 8/30 717/106 |
| 2006/0218123 A1* | 9/2006 | Chowdhuri | G06F 16/24532 |
| 2007/0061318 A1 | 3/2007 | Azizi et al. | |
| 2007/0162425 A1* | 7/2007 | Betawadkar-Norwood | G06F 16/24535 |
| 2008/0065591 A1 | 3/2008 | Guzenda | |
| 2009/0006320 A1* | 1/2009 | Ding | G06F 16/24568 |
| 2009/0204593 A1 | 8/2009 | Bigby et al. | |
| 2010/0030741 A1 | 2/2010 | Johnson et al. | |
| 2011/0246448 A1* | 10/2011 | Tatemura | G06F 16/24526 707/718 |
| 2011/0302583 A1* | 12/2011 | Abadi | G06F 16/2471 718/102 |
| 2013/0042248 A1 | 2/2013 | Gargash | |
| 2014/0095474 A1* | 4/2014 | Chakkappen | G06F 16/24544 707/718 |
| 2014/0214754 A1* | 7/2014 | Li | G06F 16/24524 707/603 |
| 2015/0006468 A1 | 1/2015 | Duan et al. | |
| 2015/0032694 A1 | 1/2015 | Rajamani et al. | |
| 2015/0149435 A1* | 5/2015 | McKenna | G06F 16/24544 707/718 |
| 2015/0154256 A1* | 6/2015 | McKenna | G06F 16/24542 707/718 |
| 2015/0317363 A1 | 11/2015 | Manzano Macho et al. | |
| 2018/0096031 A1 | 4/2018 | Stanley | |

OTHER PUBLICATIONS

Agrawal et al., "Data Platform for Machine Learnning", ACM 2019 (Year: 2019).*

Zhu et al.; "Adapting Partitioned Continuous Query Processing In Distributed Systems", Data Engineering Workshop, IEEE 23rd Inter. Conf. On, Apr. 17-20, 2007, pp. 594-603.

Fischer et al.; "Workload Scheduling In Distributed Stream Processors Using Graph Partitioning", Big Data, IEEE International Conference on Big Data, Oct. 29-Nov. 1, 2015, pp. 124-133.

List of IBM Patents or Patent Applications Treated as Related, filed Aug. 29, 2019.

* cited by examiner

DATABASE-AGNOSTIC PARALLEL READS

BACKGROUND

1. Technical Field

Present invention embodiments relate to database query processing, and more specifically, to reading data from a database in parallel data streams based on data partitioning instructions.

2. Discussion of the Related Art

To accomplish adequate throughput in database applications, it is often necessary to read the data in parallel from multiple threads and to process the data in parallel pipelines. Such applications need to partition the data, such that each pipeline receives a subset of the data, whereby no row is read by more than one thread.

Applications can be designed to work with multiple different database types, such as through Open Database Connectivity (ODBC) or Java Database Connectivity (JDBC) mechanisms. Beneficially, an application written using ODBC or JDBC can be ported to other platforms, both on the client and server side, with few changes to the data access code. However, there is currently no standard way in Structured Query Language (SQL) to construct a query that returns a subset of the selected data for a given pipeline.

Existing applications partition data through various mechanisms including: utilizing existing database-specific partitioning; using a function on one or more columns to calculate which query data reader should receive a row (e.g., using a modulus operation on an integer column); partitioning a data range across multiple data readers. While such approaches can be effective, they require that the application knows critical information about the source table. If a custom application is created, and the schema is fixed and known, then the application can readily use any of the approaches listed above to partition the data. However, for generic applications, such as extract-transform-load (ETL) data integration tools, it is difficult for the application to know which method to use to partition the data unless the user of the application or tool manually configures the source query. It may also require the input of information that the user of the application may not know. Accordingly, database-agnostic parallelism for query processing is an active field for research and development.

SUMMARY

According to one embodiment of the present invention, a query into a database is processed by receiving an instruction to partition data in the database into respective data partitions for the query. In response to the instruction, a query execution plan is generated that specifies the data from the database for the respective data partitions according to at least one data characteristic. The query execution plan is executed to compel reading the data of the data partitions from the database in respective data streams independently one from another.

BRIEF DESCRIPTION OF THE DRAWINGS

Generally, like reference numerals in the various figures are utilized to designate like components.

DETAILED DESCRIPTION

Figure 1:
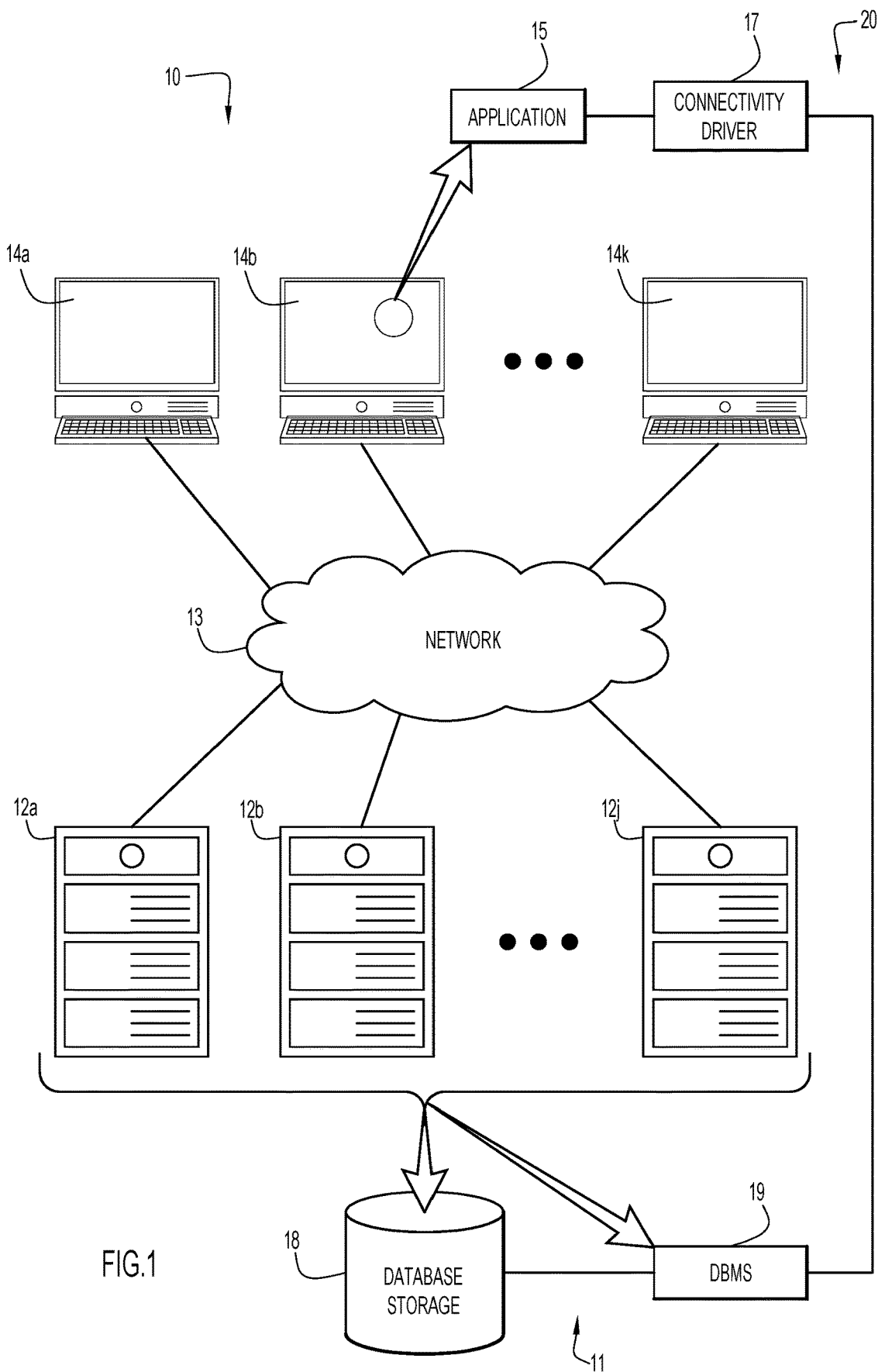
FIG. 1 is a schematic block diagram of an example environment in which the present invention can be embodied.

An example environment for use with present invention embodiments is illustrated in FIG. 1 as network infrastructure 10. As is illustrated, the environment includes one or more server systems 12a-12j, representatively referred to herein as server system(s) 12, and one or more client or end-user systems 14a-14k, representatively referred to herein as client system(s) 14. Server systems 12 and client systems 14 may be remote from each other and may communicate over a network 13. Network 13 may be implemented through any number of suitable communications media, e.g., metallic conductors, optical fiber, air, etc. using one or more signaling techniques and possibly in accordance with one or more standardized communication protocols, e.g., Internet Protocol (IP), Transport Control Protocol (TCP), User Datagram Protocol (UDP), etc. Network 13 may be supported by suitable hardware components to implement wide area networks (WAN), local area networks (LAN), internets, intranets, etc. Alternatively, server systems 12 and client systems 14 may be sufficiently local to each other to communicate with each other through direct or line-of-sight techniques, e.g., wireless radio links, fiber-less optical links, etc. In certain implementations, services and functionality of server systems 12 and those of client systems 14 may be performed by common circuitry and shared computational resources in a single device such as a workstation.

Server systems 12 and client systems 14 may be implemented by any conventional or other computer systems preferably equipped with a display or monitor, a base (e.g., including at least one processor (not illustrated), one or more memories (not illustrated) and/or internal or external network interfaces or communications devices, e.g., modem, network cards, etc. (not illustrated), optional input devices, e.g., a keyboard, mouse or other input device (not illustrated), and any commercially available, open-source and custom software, e.g., operating system, server/communications software, browser/interface software, etc.

One or more client systems 14 and/or one or more server systems 12 may be constructed or otherwise configured to implement an application framework 20 by which an application 15 executing on a client system 14 can access and utilize information maintained in a database 11. To that end, application framework 20 may include a database connectivity driver 17 that provides a translation layer between application 15 and database management system (DBMS) 19. By way of this translation layer, developers can develop database applications, such as application 15, without explicit knowledge of implementation details of the target database. Such applications are referred to herein as database-agnostic and database connectivity drivers 17 and corresponding database connectivity driver managers (not illustrated) may be components of a database connectivity application programming interface (API) such as Open Database Connectivity (ODBC), Java Database Connectivity (JDBC) and others. A database is not generally portable across different DBMSs, but different DBMS can interoperate by using standards such as SQL and ODBC or JDBC to allow a single application to work with more than one DBMS.

DBMS 19 is a computer-executable component, e.g., a software application, that interacts with users, other applications, and database storage 18 to define, create, query, update, and administer schemas, tables, queries, reports, views, and other objects stored on database storage 18. For purposes of explanation and not limitation, database 11 will be realized according to a model that supports Standard Query Language (SQL), with the noted variations described below. The skilled artisan may recognize other database models in which the present invention can be embodied without departing from the spirit and intended scope thereof.

Figure 2:
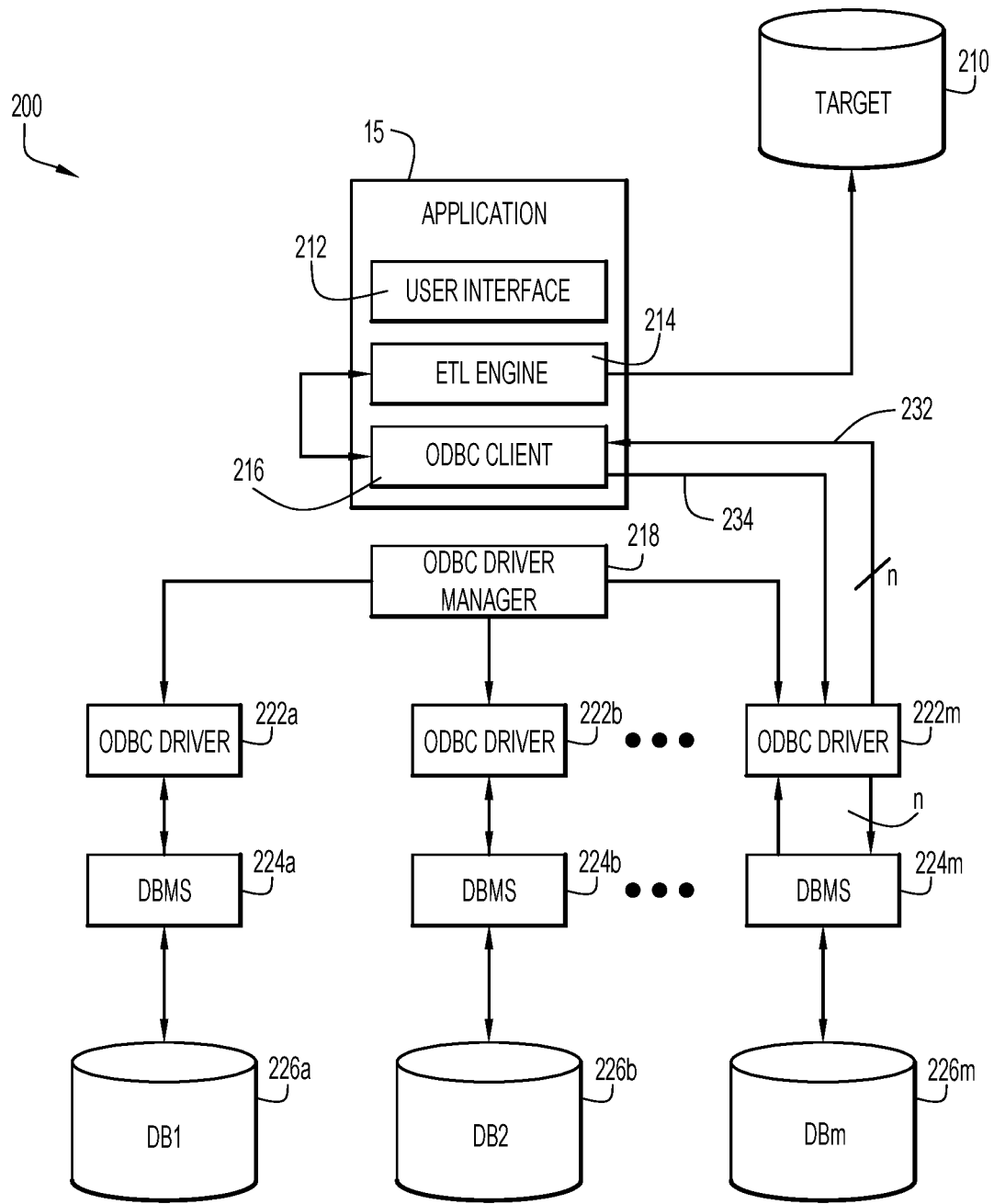
FIG. 2 is a schematic block diagram of an application framework on which the present invention can be embodied.

FIG. 2 is a schematic block diagram of an example application framework 200 according to an embodiment of the invention. It is to be understood that the set of components illustrated in FIG. 2 is not exhaustive; other components may be needed to implement application framework 200. However, those having skill in database applications will recognize and understand such implementation details without those details being explicitly set forth herein. The diagram illustrated in FIG. 2 is intended to provide a broad understanding of an example embodiment of the present invention.

For purposes of explanation and not limitation, application 15 is an ETL application by which data from one or more source databases 226a-226n, representatively referred to herein as source database(s) 226, are ultimately stored in a target database 210 after ETL processing. To that end, application 15 may include certain components implemented in hardware and software such as a user interface component 212, an ETL engine 214 and an ODBC client component 216. Application 15 may execute on processing resources (processors, memory, support circuitry) of a client machine 14, which may also execute an ODBC driver manager 218 and one or more ODBC drivers 222a-222m, representatively referred to herein as ODBC driver(s) 222. It is to be understood that while application 200 utilizes ODBC for database connectivity, other database connectivity APIs, such as JDBC, may be used in conjunction with the present invention without departing from the spirit and intended scope thereof.

Source databases 226 may be realized in one or more servers 12 and may be configured using different and distinct database architectures. That is, each database 226 may use a unique or distinct collection of schemas, tables, queries, reports, views, and other objects that are accessed through respective DBMSs 224a-224m, representatively referred to herein as DBMS(s) 224. ODBC drivers 222 are configured to interoperate with corresponding DBMSs 224 and encapsulate many functions including finding, connecting to and disconnecting from the DBMS with which that driver communicates; sending SQL commands from the ODBC system to the DBMS, converting or interpreting any commands that are not supported internally and supporting a set of mostly internal commands that convert data from the DBMS's internal formats to a set of standardized ODBC formats.

For data integration, ETL engine 214 of application 15 is connected to a source of data, from which relevant information is extracted, transformed into a format suitable for storage, queries, analysis, etc., and loaded into a target data store, such as a data warehouse. For purposes of description, it will be assumed that the desired source data is stored in database 226m and a database connection to that database is opened either by a user through user interface 212 or by automatic selection routines associated or otherwise included in application 15. Under such conditions, ODBC driver manager 218 may instantiate or otherwise activate ODBC driver 222m, which opens a connection with DBMS 224m. Those having skill in database connectivity systems will recognize opening such connection in the foregoing manner is routine and well understood. Once this connection has been established, ODBC client component 216 may issue a command 234 requesting the desired data from database 226m through DBMS 224m. Command 234 may include appropriate query language statements (e.g., SQL) that specify the data to retrieve, as is explained in more detail below. In accordance with aspects of the present invention, the specified data are returned to application 15 in n data streams 232, each data stream 232 carrying data from one of n data partitions formed in response to an instruction in command 234. Each data stream 232 undergoes query processing corresponding to the query language statements in a separate processing pipeline executing concurrently with the pipelines processing other data streams 232.

In certain implementations, the query engine may receive multiple queries from multiple threads, each with differing PARTITION clauses. As multiple threads start and execute their individual SELECT statement, these threads may arrive at the DBMS at slightly different times, but within a very small window. Accordingly, the query planner, once having determined the query plan for the first statement, may be configured to cache and reuse that plan for subsequent statements. The individual statements may be tracked by the query engine so that results of different queries will be derived from the partitioning plan corresponding to the particular individual queries. To achieve the tracking, statements of different partitions may be assigned an identifier, which may be included in the query statements of different partitions for the same query. For example, certain embodiments may include an identifier clause:

SELECT . . . . PARTITION 1 of 4 IDENTIFIER 23hj4242g where IDENTIFIER includes some indication, such as a globally unique identifier (GUID) or an otherwise unique character string that the DBMS could use to track queries arriving in temporally offset streams or threads.

Figure 3:
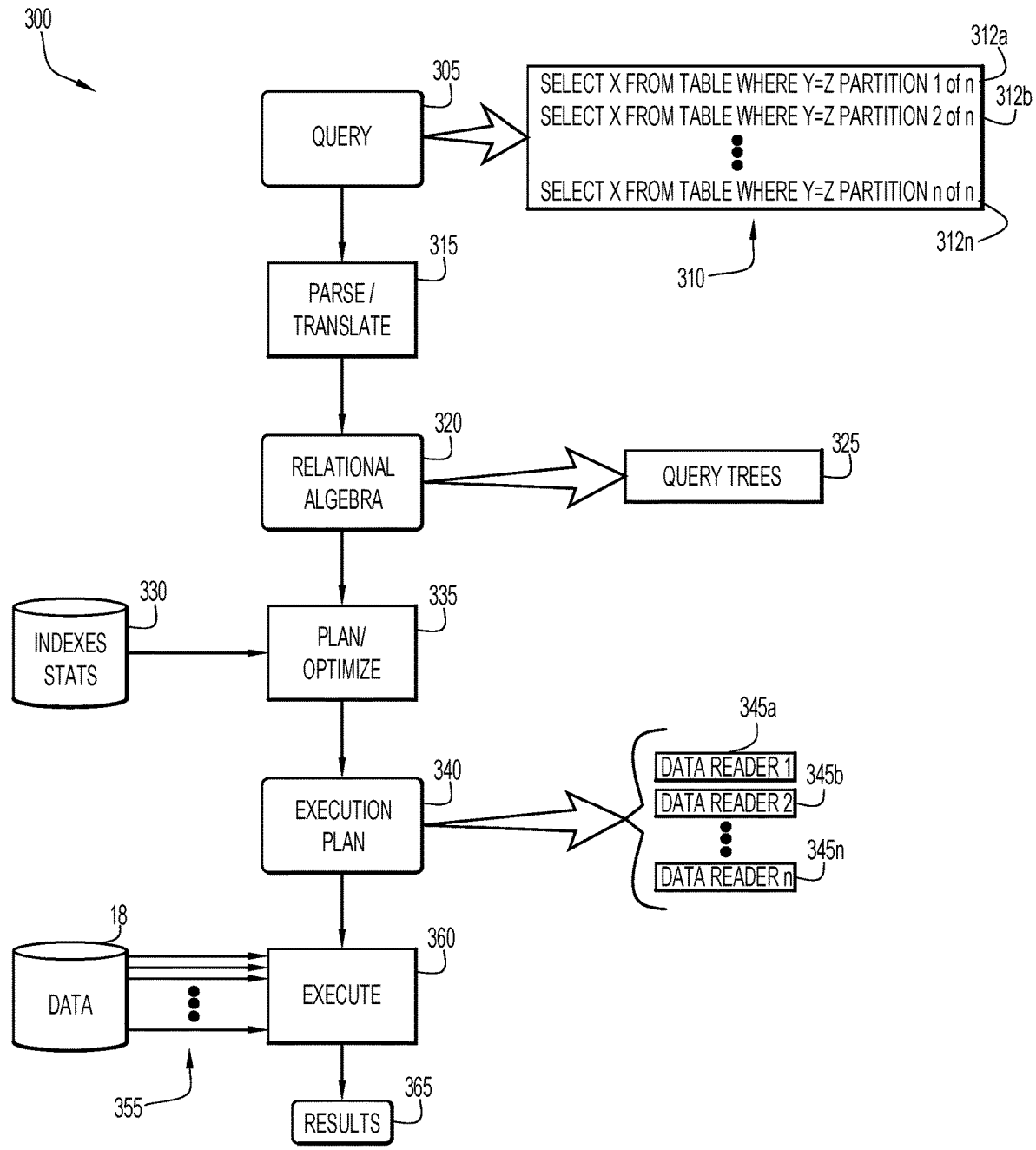
FIG. 3 is a schematic flow diagram of an example query engine by which the present invention can be embodied.

FIG. 3 illustrates a query engine 300 and its concomitant operational flow according to certain embodiments of the present invention. Query engine 300 receives a query 305, which may be contained in or otherwise a part of a command 310, such as from application 15, submitted through a database connection. In accordance with principles of the present invention, query 305 may include an instruction that is executable by query engine 300 to partition the database for parallel query processing. In the embodiment illustrated in FIG. 3, the partitioning instruction 310 is distributed over a number of query statements 312a-312n, hereinafter referred to as query statement(s) 312, of the form:

SELECT x FROM table WHERE y=z PARTITION m of n.

It is to be understood that while example query statements 312 are based in SELECT clauses, the present invention is not so limited.

As illustrated in FIG. 3, query 305 may be provided to parse/translate component 315, which parses query statements 312 and translates the parsed statements into a relational algebra representation 320. In certain embodiments, relational algebra representation 320 may take the form of query trees 325, in which, for example, the inner nodes are relational algebraic operators, leaves are relations and subtrees are sub-expressions. In certain embodiments, separate query trees 325 are constructed for each database partition specified in the instruction 310.

Relational algebra representation 320 may be provided plan/optimize component 335 by which query 305 is prepared for execution based on database indexes and statistics 330. In addition to conventional query planning and optimization, plan/optimize component 335 may be constructed or otherwise configured to determine a partitioning scheme that meets the requirements of query statements 312. To make such determination, plan/optimize component 335 may take the following into consideration: in-place physical partitioning of the relevant table; row IDs or similar data features that render the data conducive to partitioning; well-distributed values in a numeric column; known or obtainable minimum and maximum values of a numeric column; and ranges or other features specified in a WHERE clause in the query. It is to be understood that the foregoing list is by no means exhaustive; plan/optimize component 335 may use any available table statistics to determine the appropriate partitioning scheme. In the case of executing table data joins, the plan/optimize component 335 may apply partitioning to whichever table in the join would result in a relatively even distribution to each partition.

Plan/optimize component 335 may produce a query execution plan 340, which includes instructions that are executable by query execution component 360. According to aspects of the present invention, execution plan 340 is generated to include instructions that compel query execution component 360 to collect the partitioned data in parallel processing streams. In certain embodiments, such instructions may instantiate data readers 345a-345n, representatively referred to herein as data reader(s) 345. Accordingly, when query execution plan 340 is executed in query execution component 360, partitioned data are read from data storage 18 in independently-read, parallel data streams 355. Execution component 360 performs query processing on each data stream 355 to produce query results 365.

Figure 4:
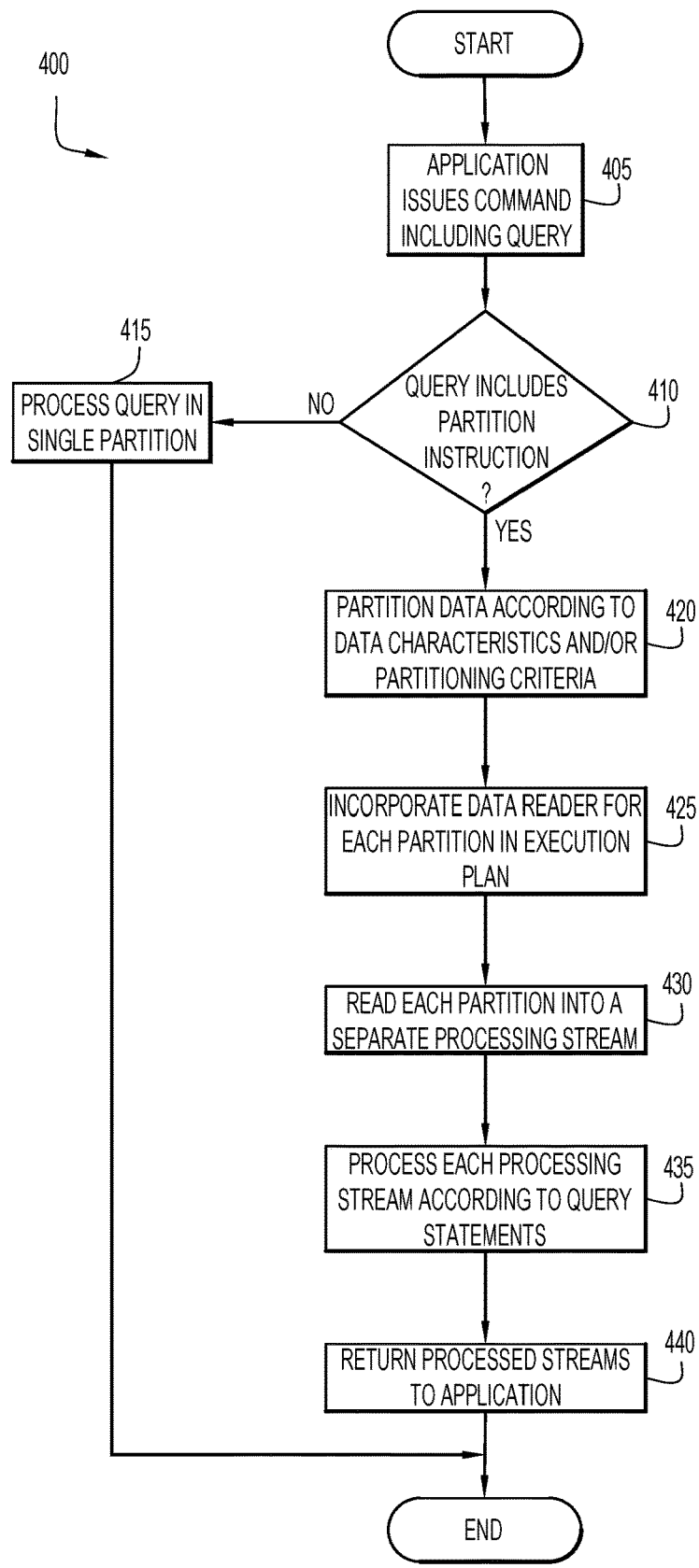
FIG. 4 is a flow diagram of an example parallel query data reading process by which the present invention can be embodied.

FIG. 4 is a flow diagram illustrating a parallel reading process 400 by which the present invention can be embodied. In operation 405, an application issues a command that includes a database query. Such application, e.g., application 15, may issue the command in a database-agnostic manner, such as through ODBC or JDBC. In operations 410, it is determined whether the query in the command contains a partitioning instruction. If not, the query is processed in a single partition in operation 415. Otherwise, process 400 transitions to operation 420 in which partitions are chosen for the data specified in the query statements. As discussed above, the data may be partitioned according to characteristics of the data and/or by other partitioning criteria. In operation 425, the query execution plan is generated to include instructions that, when executed by the query execution component, causes the partitioned data to be read in separate streams, which is performed in operation 430. In operation 435, the data in each partition, i.e., in the corresponding processing streams, are processed according to the instructions in the query statements. In operation 440, the data are returned to the application in the processed streams.

Client systems 14 enable users to execute applications 15 that submit database requests (e.g., queries) to server systems 12. A database system 11 may store various information items for use by applications 15. Database system 11 may be implemented by any conventional or other database or storage unit, may be local to or remote from server systems 12 and client systems 14, and may communicate via any appropriate communication medium (e.g., local area network (LAN), wide area network (WAN), Internet, hardwire, wireless link, Intranet, etc.). Client systems 14 may present a graphical user (e.g., GUI, etc.) or other interface (e.g., command line prompts, menu screens, etc.) into application 15 to solicit information from users and may provide reports (e.g., query results, ETL text analytics, etc.).

Server systems 12 and client systems 14 may be implemented by any conventional or other computer systems preferably equipped with a display or monitor, a base (e.g., including at least one processor, one or more memories and/or internal or external network interfaces or communications devices (e.g., modem, network cards, etc.)), optional input devices (e.g., a keyboard, mouse or other input device), and any commercially available and custom software (e.g., operating system, server/communications software, database connectivity component (e.g., ODBC or JDBC), query engine, browser/interface software, etc.).

The various modules and/or components (e.g., application 15, database connectivity drivers 222, database connectivity driver manager 218, query engine 300, etc.) may be implemented by any combination of any quantity of software and/or hardware modules or units, and may reside within memory of server 12 and/or client systems 14 for execution by one or more processors therein.

It will be appreciated that the embodiments described above and illustrated in the drawings represent only a few of the many ways of implementing embodiments for database-agnostic parallel reads from databases.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, application software, database connectivity software, query engine software, etc.). These systems may include any types of monitors and input devices (e.g., keyboard, mouse, voice recognition, etc.) to enter and/or view information.

It is to be understood that the software (e.g., database applications, DBMS, query engine, database connectivity interface, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., database applications, DBMS, query engine, database connectivity interface, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., table data). Database system 11 may be implemented by any number of any conventional or other databases, data stores or storage structures (e.g., files, databases, data structures, data or other repositories, etc.) to store information (e.g., table data). Database system 11 may be included within or coupled to server 12 and/or client systems 14. The database systems and/or storage structures may be remote from or local to the computer or other processing systems, and may store any desired data (e.g., text documents, images, video and/or audio data, etc.).

The present invention embodiments may employ any number of any type of user interface (e.g., Graphical User Interface (GUI), command-line, prompt, etc.) for obtaining or providing information (e.g., application input, query parameters, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any task or application that requires database access.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing a query into a database, the method comprising:

receiving an instruction in each of a plurality of structured query language statements of the query to partition data in the database into a plurality of data partitions for the query, wherein each of the plurality of structured query language statements includes search criteria and the instruction in each of the plurality of structured query language statements specifies a total number of data partitions for the plurality of data partitions for the query and a particular data partition of the total number of data partitions to apply the search criteria of that structured query language statement, and wherein the query includes a structured query language statement for each of the plurality of data partitions;

generating, in response to the instruction in the plurality of structured query language statements, a partitioning plan for the query to partition the data in the database into the total number of data partitions according to a plurality of data characteristics and a query execution plan that specifies the data from the database for each of the plurality of data partitions, wherein the plurality of data characteristics includes in-place physical partitioning of a database table, row-IDs, distribution of values within one or more database table columns, and minimum and maximum values of at least one database table column; and executing the query execution plan to compel reading the data of the data partitions from the database in respective parallel data streams independently one from another and process the structured query language statements in respective parallel query processing pipelines to apply the search criteria of each structured query language statement in a respective parallel query processing pipeline against a data stream of the particular data partition specified in the instruction of that structured query language statement.

2. The method of claim 1, wherein generating the query execution plan comprises:
selecting a data characteristic from optimizing criteria that partitions the data over the total number of data partitions.

3. The method of claim 1, further comprising:
selecting a database connectivity driver for the database; and
issuing the instruction in the plurality of structured query language statements to partition data in the database through the selected database connectivity driver.

4. A system for processing a query into a database, the system comprising:
at least one hardware processor communicatively coupled to the database, the at least one hardware processor configured to:
receive an instruction in each of a plurality of structured query language statements of the query to partition data in the database into a plurality of data partitions for the query, wherein each of the plurality of structured query language statements includes search criteria and the instruction in each of the plurality of structured query language statements specifies a total number of data partitions for the plurality of data partitions for the query and a particular data partition of the total number of data partitions to apply the search criteria of that structured query language statement, and wherein the query includes a structured query language statement for each of the plurality of data partitions;
generate, in response to the instruction in the plurality of structured query language statements, a partitioning plan for the query to partition the data in the database into the total number of data partitions according to a plurality of data characteristics and a query execution plan that specifies the data from the database for each of the plurality of data partitions, wherein the plurality of data characteristics includes in-place physical partitioning of a database table, row-IDs, distribution of values within one or more database table columns, and minimum and maximum values of at least one database table column; and
execute the query execution plan to compel reading the data of the data partitions from the database in respective parallel data streams independently one from another and process the structured query language statements in respective parallel query processing pipelines to apply the search criteria of each structured query language statement in a respective parallel query processing pipeline against a data stream of the particular data partition specified in the instruction of that structured query language statement.

5. The system of claim 4, wherein the at least one hardware processor is configured to:
select a data characteristic from optimizing criteria that partitions the data over the total number of data partitions.

6. The system of claim 4, wherein the at least one hardware processor is configured to:
select a database connectivity driver for the database; and
issue the instruction in the plurality of structured query language statements to partition data in the database through the selected database connectivity driver.

7. A computer program product for processing a query into a database, the computer program product comprising one or more computer readable storage media collectively having program instructions embodied therewith, the program instructions executable by at least one processor to cause the at least one processor to:
receive an instruction in each of a plurality of structured query language statements of the query to partition data in the database into a plurality of data partitions for the query, wherein each of the plurality of structured query language statements includes search criteria and the instruction in each of the plurality of structured query language statements specifies a total number of data partitions for the plurality of data partitions for the query and a particular data partition of the total number of data partitions to apply the search criteria of that structured query language statement, and wherein the query includes a structured query language statement for each of the plurality of data partitions;
generate, in response to the instruction in the plurality of structured query language statements, a partitioning plan for the query to partition the data in the database into the total number of data partitions according to a plurality of data characteristics and a query execution plan that specifies the data from the database for each of the plurality of data partitions, wherein the plurality of data characteristics includes in-place physical partitioning of a database table, row-IDs, distribution of values within one or more database table columns, and minimum and maximum values of at least one database table column; and
execute the query execution plan to compel reading the data of the data partitions from the database in respective parallel data streams independently one from another and process the structured query language statements in respective parallel query processing pipelines to apply the search criteria of each structured query language statement in a respective parallel query processing pipeline against a data stream of the particular data partition specified in the instruction of that structured query language statement.

8. The computer program product of claim 7, wherein the program instructions cause the at least one processor to:
select a data characteristic from optimizing criteria that partitions the data over the total number of data partitions.

9. The computer program product of claim 7, wherein the program instructions cause the at least one processor to:
select a database connectivity driver for the database; and
issue the instruction in the plurality of structured query language statements to partition data in the database through the selected database connectivity driver.

* * * * *